US006628196B1

(12) United States Patent
Flick (10) Patent No.: US 6,628,196 B1
(45) Date of Patent: Sep. 30, 2003

(54) VEHICLE CONTROL SYSTEM WITH PIGGYBACK CONTROLLER AND ASSOCIATED METHODS

(75) Inventor: Kenneth E. Flick, Douglasville, GA (US)

(73) Assignee: Omega Patents, LLC, Douglasville, GA (US)

( * ) Notice: Subject to any disclaimer, the term of this patent is extended or adjusted under 35 U.S.C. 154(b) by 32 days.

(21) Appl. No.: 10/094,557

(22) Filed: Mar. 8, 2002

(51) Int. Cl.[7] ............................................... B60R 25/10
(52) U.S. Cl. ..................... 340/426; 340/5.22; 340/5.25; 340/5.72; 701/2
(58) Field of Search .......................... 340/426, 539.11, 340/5.1, 5.2, 825.22, 5.22, 5.23, 5.25, 5.31, 5.64, 5.72, 825.69; 307/9.1, 10.1, 10.2, 10.3; 701/2

(56) References Cited

U.S. PATENT DOCUMENTS

| | | | | |
|---|---|---|---|---|
| 5,278,547 A | * | 1/1994 | Suman et al. ............... 340/5.72 |
| 5,534,845 A |   | 7/1996 | Issa et al. ................. 340/425.5 |
| 5,563,600 A | * | 10/1996 | Miyake ....................... 341/173 |
| 5,646,701 A | * | 7/1997 | Duckworth et al. ... 340/825.69 |
| 5,736,935 A | * | 4/1998 | Lambropoulos ....... 340/825.69 |
| 5,838,255 A | * | 11/1998 | Di Croce ............... 340/825.69 |
| 5,850,174 A | * | 12/1998 | Di Croce et al. ........... 340/426 |
| 5,864,297 A | * | 1/1999 | Sollestre et al. ........... 340/5.72 |
| 5,905,431 A |   | 5/1999 | Mueller et al. ............. 340/426 |
| 6,078,264 A | * | 6/2000 | Nose et al. ................. 340/5.72 |
| 6,184,779 B1 | * | 2/2001 | Chen ....................... 340/425.5 |
| 6,297,731 B1 | * | 10/2001 | Flick .......................... 340/426 |

* cited by examiner

Primary Examiner—Toan Pham
(74) Attorney, Agent, or Firm—Allen, Dyer, Doppelt, Milbrath & Gilchrist, P.A.

(57) ABSTRACT

A vehicle control system for a vehicle having a door lock actuator includes a remote keyless entry (RKE) system including an RKE transmitter carried by a user, an RKE receiver at the vehicle, and an RKE controller connected to the RKE receiver for selectively operating the door lock actuator based on signals from the RKE transmitter. A piggyback controller at the vehicle is connected to the door lock actuator for performing at least one desired piggyback control function based on selective operation of the door lock actuator by the RKE controller. The piggyback controller may switch to a feature programming mode based on selective operation of the door lock actuator. When in the feature programming mode, the piggyback controller may permit feature selection also based on selective operation of the door lock actuator. The piggyback controller may also be switched to an override or valet mode based on selective operation of the door lock actuator.

55 Claims, 4 Drawing Sheets

VEHICLE CONTROL SYSTEM WITH PIGGYBACK CONTROLLER AND ASSOCIATED METHODS

FIELD OF THE INVENTION

The present invention relates to the field of control systems, and, more particularly to a vehicle control system and related methods.

BACKGROUND OF THE INVENTION

Vehicle control systems are widely used to perform various security-related vehicle functions. A vehicle control system typically includes a controller and a receiver connected thereto. The security-related functions typically performed by the controller include locking/unlocking doors, or switching between armed and disarmed modes responsive to signals received from a remote transmitter. In other words, the remote transmitter permits a user to perform various security-related vehicle functions from a distance away from the vehicle.

It is known to provide vehicle control systems that allow programming using a valet switch and a remote transmitter, as disclosed, for example, in U.S. Pat. No. 5,654,688 to Allen et al. The system allows a user to enter a user programming mode, scroll through features to be selected, select desired features, and exit the user programming mode.

Some vehicles come from the factory having a remote keyless entry (RKE) system, such as disclosed in U.S. Pat. No. 5,252,966 to Lambropoulous et al. The RKE system permits a user to remotely open the vehicle doors or open the vehicle trunk using a small handheld transmitter. U.S. Pat. No. 5,905,431 to Mueller et al. discloses adding a vehicle security system to an existing RKE system, wherein the added vehicle security system is responsive to the existing RKE transmitter. This is accomplished by wiring the vehicle security system to the door lock motor. The vehicle security system then is used in combination with the RKE system to provide vehicle security functions. The vehicle security system disclosed in Mueller, however, does not disclose any method of programming selectable features of the vehicle security system once installed with the existing RKE system. Further, RKE systems are limited as to the types of vehicle security functions that can be performed.

Many vehicle control systems are also generally limited as to feature programming. The programming of features for the system can be complicated and sometimes require a user to bring the vehicle to an installer or manufacturer. Some systems use a combination of events that include use of the transmitter and a valet switch located within the passenger compartment to achieve feature programming. Unfortunately, this can be time consuming and difficult to perform.

SUMMARY OF THE INVENTION

In view of the foregoing background, it is therefore an object of the present invention to provide a vehicle security system and associated methods to facilitate feature programming, for example.

This and other objects, features and advantages in accordance with the present invention are provided by a vehicle control system for a vehicle having at least one door lock actuator. The vehicle control system includes a remote keyless entry (RKE) system having an RKE transmitter carried by a user, an RKE receiver at the vehicle, and an RKE controller connected to the RKE receiver for selectively operating the door lock actuator based on signals from the RKE transmitter. The vehicle control system may also include a piggyback controller at the vehicle and connected to the door lock actuator for performing at a desired piggyback control function based on selective operation of the door lock actuator by the RKE controller. Moreover, the piggyback controller may switch to a feature programming mode based on selective operation of the door lock actuator. Further, when in the feature programming mode, the piggyback controller may advantageously permit feature selection based on selective operation of the door lock actuator.

The selective operation of the door lock actuator can be operated in a predetermined pattern and can be caused by the RKE controller or by a manually operable door lock switch. When in the feature programming mode, the piggyback controller can advantageously permit feature selection also based on selective operation of the door lock actuator caused by the RKE controller or by the manually operable door lock switch.

The desired piggyback control function may include switching between armed and disarmed modes or remote engine starting, for example. The vehicle may further include a position determining device cooperating with the piggyback controller.

The piggyback controller may also be switched to the feature programming mode based on selective activation of at least one other vehicle device, such as a vehicle ignition switch. The vehicle control system may be switched between armed and disarmed modes, and be switched to the feature programming mode from the disarmed mode and not the armed mode. The piggyback controller may also be switched to a valet mode or an override mode based on selective operation of the door lock actuator.

Another aspect of the invention also relates to a vehicle control system for a vehicle having a door lock actuator, an RKE system and piggyback controller as discussed above. The piggyback controller may switch to an override mode or a valet mode based on selective operation of the door lock actuator. In other words, in these embodiments, feature programming via the door lock actuator need not be included.

A method aspect of the invention is for operating a vehicle control system for a vehicle of the type having a door lock actuator and an RKE system. The method may include providing a piggyback controller at the vehicle that is connected to the door lock actuator for performing a piggyback control function based on selective operation of the door lock actuator by an RKE controller. The method also preferably includes switching the piggyback controller to a feature programming mode based on selective operation of the door lock actuator. The method may include providing a piggyback controller at the vehicle that is connected to the door lock actuator for performing at least one desired piggyback control function based on selective operation of the door lock actuator by the RKE controller. The method may also include switching the piggyback controller to an override mode or a valet mode based on selective operation of the door lock actuator.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
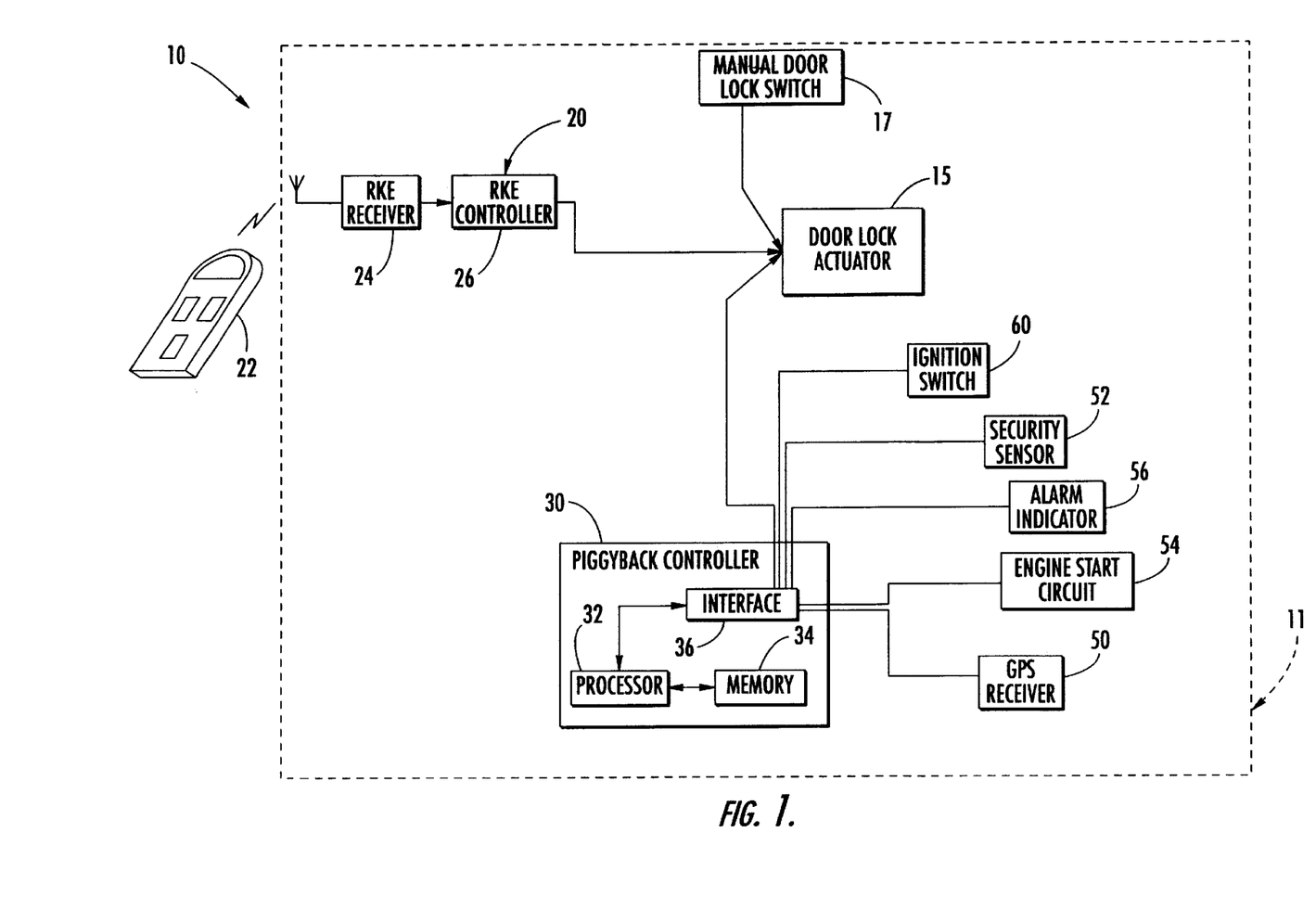
FIG. 1 is a schematic diagram of a vehicle control system according to the present invention.

Referring initially to FIG. 1, a vehicle control system 10 for a vehicle 11 having at least one door lock actuator 15 in accordance with the invention is now described. The system 10 includes a remote keyless entry (RKE) system 20, which in turn, includes an RKE transmitter 22 carried by a user, an RKE receiver 24 at the vehicle, and an RKE controller 26 connected to the RKE receiver for selectively operating the door lock actuator 15 based on signals from the RKE transmitter.

The vehicle control system 10 also illustratively includes a piggyback controller 30 at the vehicle 11. The piggyback controller 30 includes a processor 32, a memory 34 connected to the processor and a interface 36 connected to the processor. The piggyback controller 30 is also illustratively connected to the door lock actuator 15 for performing a desired piggyback control function based on selective operation of the door lock actuator 15 by the RKE controller 26. For example, the piggyback controller 30 may switch between armed and disarmed modes as the RKE system 20 causes the door lock actuator 15 to switch from a locked position to an unlocked position.

The piggyback controller 30 may also switch to a feature programming mode based on selective operation of the door lock actuator 15. When in the feature programming mode, the piggyback controller 30 may also permit feature selection based on selective operation of the door lock actuator 15.

The door lock actuator 15 can be operated in a predetermined pattern, such as operating the door lock actuator a predetermined number of consecutive times or using a predetermined time interval when operating the door lock actuator. In other words, the predetermined pattern may be operating the door lock actuator 15 five times, waiting five seconds, and operating the door lock actuator another five times. The piggyback controller 30 can be switched to the feature programming mode based on selective operation of the door lock actuator 15 caused by the RKE controller 26. The RKE controller 26, upon receipt of an appropriate signal from the RKE transmitter 22, causes operation of the door lock actuator 15, which in turn allows the piggyback controller 30 to switch to the feature programming mode.

The vehicle 11 also illustratively includes a manually operable door lock switch 17 connected to the door lock actuator 15. The piggyback controller 30 can, therefore, also be switched to the feature programming mode based on selective operation of the door lock actuator 15 caused by the manually operable door lock switch 17. In other words, instead of the selective operation of the door lock actuator being caused by the RKE controller 26, it can alternately be caused by the manually operable door lock switch 17. This advantageously allows the piggyback controller 30 to be switched to the feature programming mode when the door lock switch 17 is manually operated by the user.

Once the piggyback controller 30 is switched to the feature programming mode, feature selection can be also advantageously accomplished based on selective operation of the door lock actuator 15 caused by the RKE controller 26. For example, the user may scroll through features and select a feature when in the feature programming mode by selectively operating the door lock actuator 15 as caused by the RKE controller 26. In other words, the user operates the RKE transmitter 22 to transmit a signal to the RKE controller 26 so as to selectively operate the door lock actuator 15 to scroll through and select features when in the feature programming mode.

The piggyback controller 30 may also permit feature selection based on selective operation of the door lock actuator 15 caused by the manually operable door switch 17. As with the selective operation of the door lock actuator 15 to switch the piggyback controller 30 to the feature programming mode, the selective operation of the door lock actuator 15 to select features when in the feature programming mode can advantageously be based on a predetermined pattern of operation of the door lock actuator 15 as described above.

One of the desired piggyback control functions that may be selected relate to security and may include switching between armed and disarmed modes. For example, the piggyback controller 30 may be connected to at least one vehicle security sensor 52 to sound the alarm indicator 56, if triggered in the armed mode. Other piggyback control functions relate to remote engine starting, such as the schematically illustrated engine start circuit 54. Many other piggyback control functions, may also be selected as understood by those skilled in the art. The vehicle control system 10 may also illustratively include a position determining device 50, such as a global positioning system (GPS) cooperating with the piggyback controller 30. The GPS can advantageously allow the owner of the vehicle 11 to track the location of the vehicle. This is especially helpful in cases where the vehicle 11 has been stolen or where the user is in distress and in need of assist once.

The piggyback controller 30 can illustratively be switched to the feature programming mode based on selective activation of another vehicle device, such as the ignition switch 60. The user may therefore switch the piggyback controller 30 to the feature programming mode based on selective activation of the ignition switch or based on activation of the ignition switch in combination with operation of the door lock actuator 15, for example.

The piggyback controller 30 can still further be switched to the feature programming mode based on selective operation of the ignition switch 60 and selective operation of another vehicle device, such as a valet switch, not shown. For example, the ignition switch 60 may be switched to the "on" position and the valet switch may be operated a predetermined number of consecutive times, i.e., 5 times, to switch the piggyback controller 30 to the feature programming mode. The valet switch can further be used to scroll or index through a series of features in the feature programming mode. For example, if the feature to be selected is the ninth feature found in the feature programming mode, then the valet switch may be operated nine times to index to this feature. Once the user has indexed to the feature, the door lock actuator 15 can be operated to enable or disable the feature. The user may use the RKE transmitter 22 or the manual door lock switch 17 can be used to operate the door lock actuator 15 to enable/disable the desired feature in the feature programming mode. In other words, the term "feature selection" is meant to include in alternate embodiments one or both of such an indexing and enable/disable operation as will be readily appreciated by those skilled in the art.

Also, for example, the piggyback controller 30 may be switched to the feature programming mode based on activation of the vehicle device in a predetermined pattern or based on a combination of activation of the vehicle device and operation of the door lock actuator 15, both in predetermined patterns. In other words, the ignition switch 60 may be operated a predetermined number of consecutive times or at a predetermined time interval to switch the piggyback controller 30 to the feature programming mode. The ignition switch 60 may also be operated in conjunction with the door lock actuator 15 so that a pattern of operation of the door lock actuator and a pattern of operation of the ignition switch allows a user to switch the piggyback controller 30 to the feature programming mode. For example, the user may operate the door lock actuator 15 five times when the ignition switch 60 is turned to an "on" position to switch the piggyback controller 30 to the feature programming mode. Similarly, the user may operate the door lock actuator 15 five times followed by five consecutive activations of the ignition switch 60 to switch the piggyback controller 30 to the feature programming mode.

The piggyback controller 30 may be switched between armed and disarmed modes, moreover, the piggyback controller should only be switchable to the feature programming mode when in the disarmed mode and not when in the armed mode. This advantageously prevents a would-be thief from entering the feature program mode to disable the alarm. The piggyback controller 30 may also be switched to a valet mode based on selective operation of the door lock actuator 15. Again, this advantageously provides the user with secure access to the feature programming mode by advantageously preventing the piggyback controller 30 from being switched to the feature programming mode when in the valet mode. In cases where a vehicle security system has been inadvertently activated, the piggyback controller 30 may also be switched to an override mode based on selective operation of the door lock actuator 15.

The vehicle control system 10 for a vehicle 11 having a door lock actuator 15 can also include an RKE system 20, as described above, and a piggyback controller 30 that switches to an override mode or a valet mode based on selective operation of the door lock actuator 15. The piggyback controller 30 may advantageously be switched to the override or valet modes based on selective operation of the door lock actuator 15 in a predetermined pattern. Similar to the pattern used to switch the piggyback controller 30 to the feature programming mode, the predetermined pattern can be a predetermined number of operations of the door lock actuator 15 or a predetermined time interval between operation of the door lock actuator 15.

Figure 2:
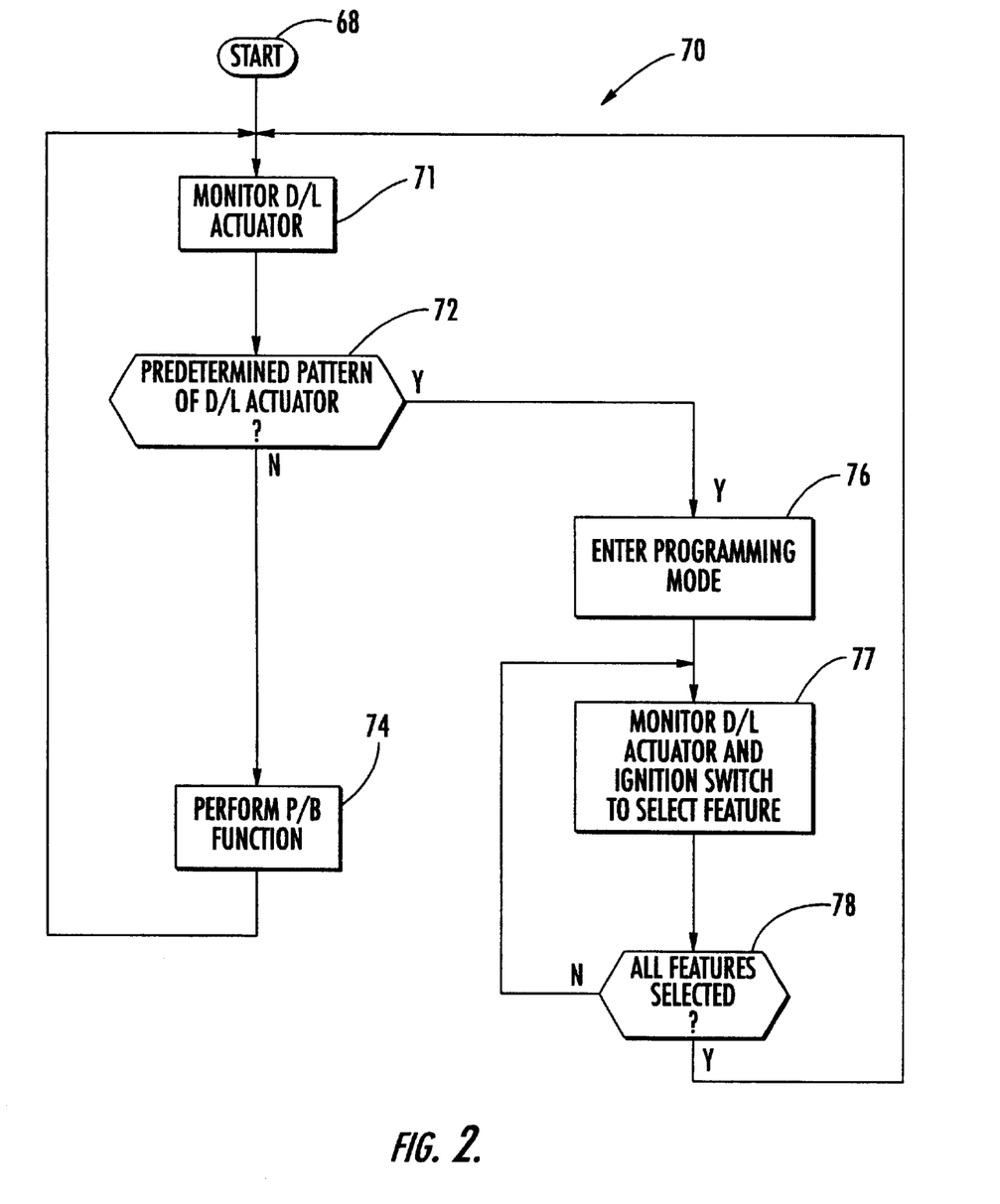
FIG. 2 is a flow chart showing operation of the vehicle control system as shown in FIG. 1.

Turning now, additionally to the flow chart 70 of FIG. 2, a method aspect of operating the vehicle control system 10 is now described. From the start (Block 68), the vehicle control system 10 may monitor the door lock actuator at Block 71. At Block 72 it is determined whether the door lock actuator 15 is being operated in a predetermined pattern, and if not, the piggyback function is performed at Block 74. After performing the piggyback function at Block 74, the door lock actuator 15 is further monitored at Block 71. If, at Block 72 it is determined that the door lock actuator 15 has not been operated in the predetermined pattern, then the vehicle control system 10 enters the programming mode at Block 76.

Looking now to the right hand side of the flow chart 70, the door lock actuator 15 and ignition switch 60 are monitored to select a feature at Block 77. It is then determined at Block 78 whether all the features have been selected. If the features have been selected, then the vehicle control system 10 continues to monitor the door lock actuator 15 at Block 71. If, however, the features have not all been selected, the vehicle control system 10 continues to monitor the door lock actuator and ignition switch at Block 77.

Figure 3:
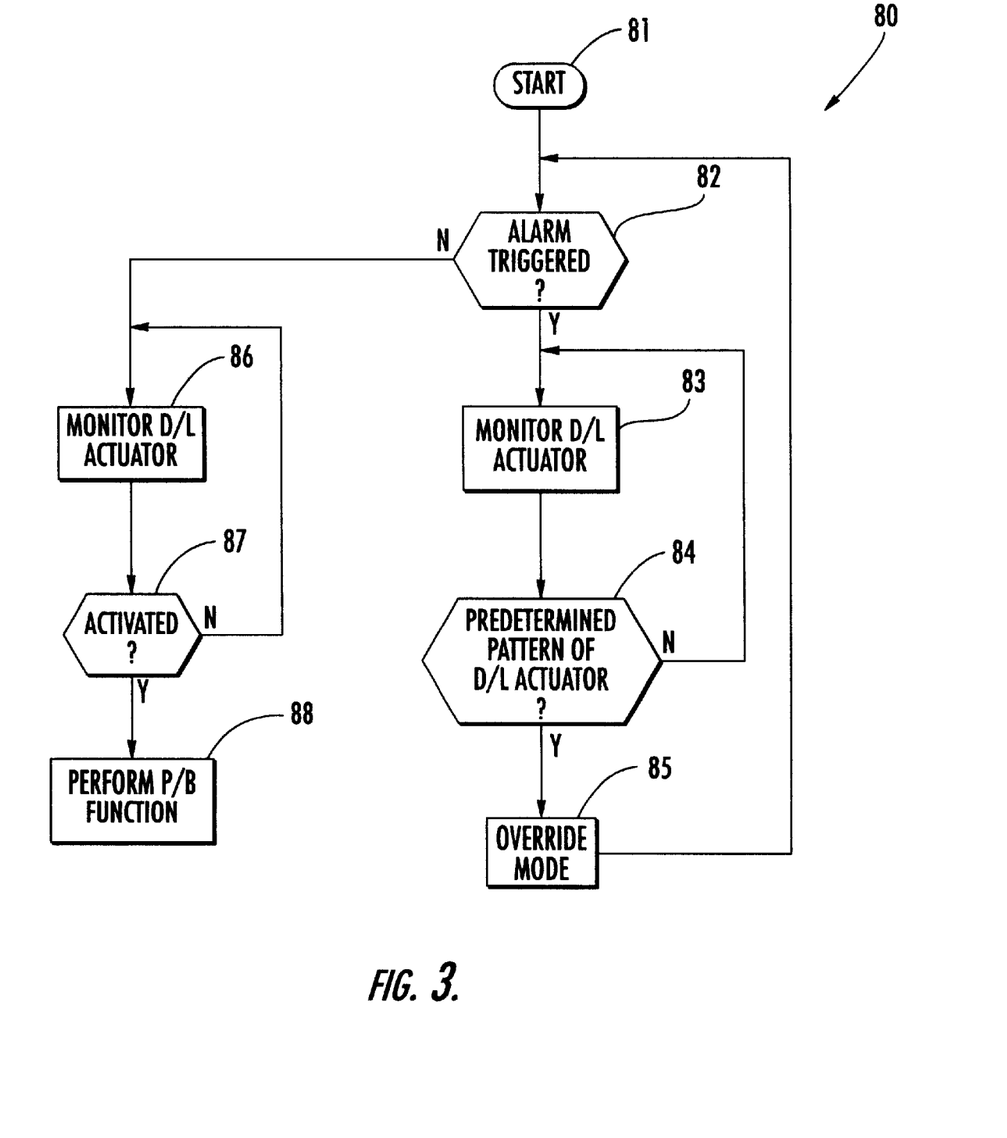
FIG. 3 is a flow chart showing operation of a vehicle control system having an override mode according to the present invention.

Turning now, additionally to the flow chart 80 of FIG. 3, another method aspect of operating the vehicle control system 10 is further described. From the start (Block 81), it is determined whether an alarm on the vehicle control system 10 is triggered at Block 82. If the alarm is triggered, the door lock actuator 15 is monitored at Block 83. At Block 84, it is determined whether the door lock actuator is being operated in a predetermined pattern, and if not, the door lock actuator is again monitored at Block 83. If, however, at Block 84 it is determined that the door lock actuator 15 has been operated in the predetermined pattern, then the vehicle control system 10 enters an override mode at Block 85.

If at Block 82 it is determined that the alarm of the vehicle control system 10 has not been triggered, then, looking now to the left hand side of the flow chart, the door lock actuator 15 is monitored at Block 86. At Block 87, it is determined whether the door lock actuator has been activated, and if so, a piggyback function is performed at Block 88. If, however, the door lock actuator 15 has not been activated, the door lock actuator is again monitored at Block 86.

Figure 4:
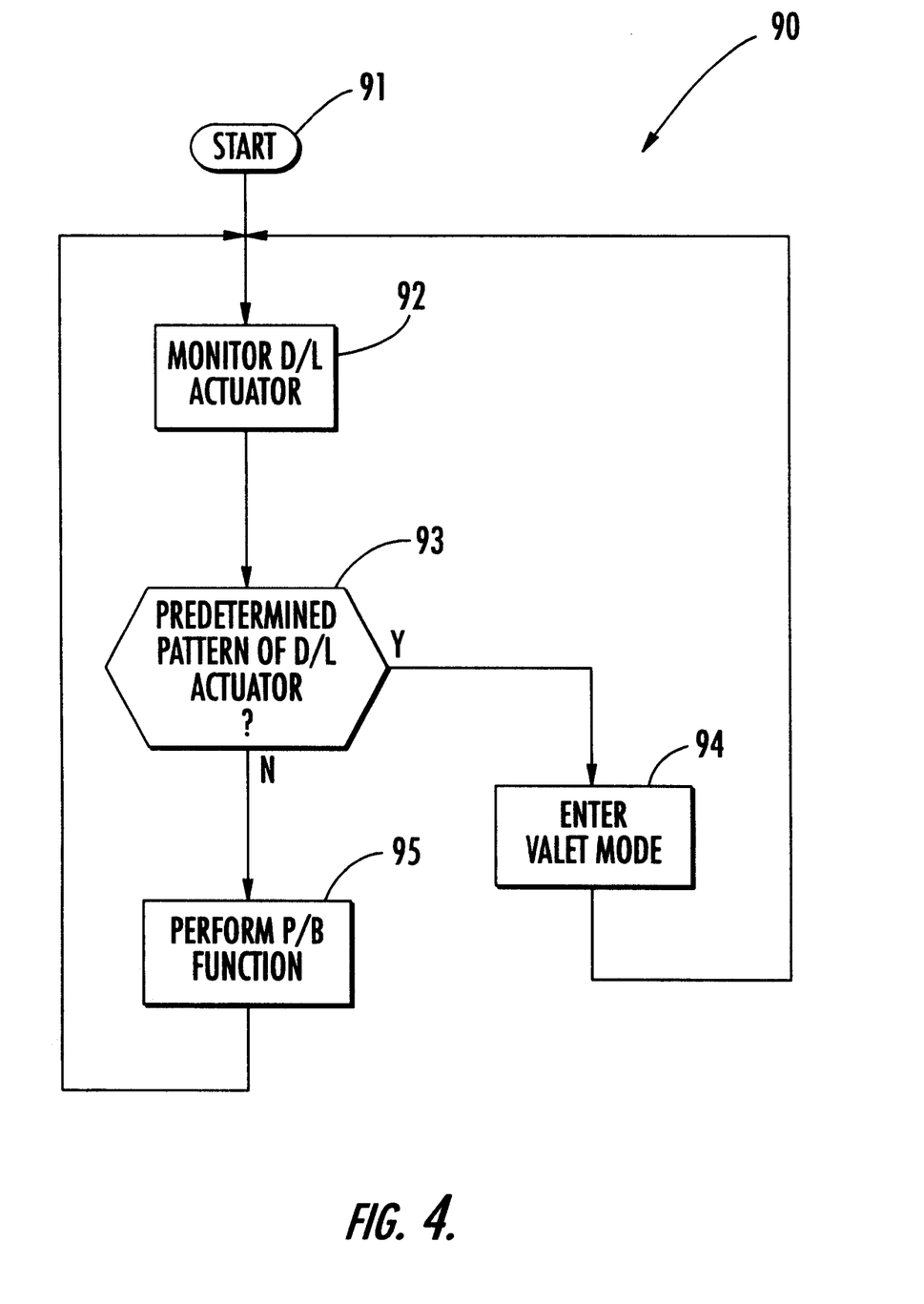
FIG. 4 is a flow chart showing operation of a vehicle control system having a valet mode according to the present invention.

Turning now, additionally to the flow chart 90 of FIG. 4, yet another method aspect is described. From the start (Block 91), the vehicle control system 10 may monitor the door lock actuator at Block 92. At Block 93 it is determined whether the door lock actuator 15 is functioning in a predetermined pattern, and if not the piggyback function is performed at Block 95. After the piggyback function is performed at Block 95, the door lock actuator is again monitored at Block 92. If, however, the door lock actuator 15 is functioning in the predetermined pattern, then the vehicle control system 10 enters the valet mode at Block 94. After the vehicle security system 10 enters the valet mode at block 94, the door lock actuator is again monitored at Block 92.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle control system for a vehicle comprising at least one door lock actuator, the vehicle control system comprising:

a remote keyless entry (RKE) system including an RKE transmitter carried by a user, an RKE receiver at the vehicle, and an RKE controller connected to said RKE receiver for selectively operating the at least one door lock actuator based on signals from said RKE transmitter; and a piggyback controller at the vehicle and connected to said at least one door lock actuator for performing at least one desired piggyback control function based on selective operation of the at least one door lock actuator by said RKE controller;

said piggyback controller switching to a feature programming mode based on selective operation of the at least one door lock actuator;

said piggyback controller, when in the feature programming mode, permitting feature selection also based on selective operation of the at least one door lock actuator.

2. A vehicle control system according to claim 1 wherein said piggyback controller switches to the feature programming mode based on selective operation of the at least one door lock actuator in a predetermined pattern.

3. A vehicle control system according to claim 1 wherein said piggyback controller switches to the feature programming mode based on selective operation of the at least one door lock actuator caused by said RKE controller.

4. A vehicle control system according to claim 1 wherein the vehicle also comprises at least one manually operable door lock switch connected to the at least one door lock actuator; and wherein said piggyback controller switches to the feature programming mode based on selective operation of the at least one door lock actuator caused by the manually operable door lock switch.

5. A vehicle control system according to claim 1 wherein said piggyback controller, when in the feature programming mode, permits feature selection also based on selective operation of the at least one door lock actuator caused by said RKE controller.

6. A vehicle control system according to claim 1 wherein the vehicle also comprises at least one manually operable door lock switch connected to the at least one door lock actuator; wherein said piggyback controller, when in the feature programming mode, permits feature selection also based on selective operation of the at least one door lock actuator caused by the at least one manually operable door lock switch.

7. A vehicle control system according to claim 1 wherein the at least one desired piggyback control function comprises switching between armed and disarmed modes.

8. A vehicle control system according to claim 1 wherein the at least one desired piggyback control function relates to remote engine starting.

9. A vehicle control system according to claim 1 further comprising a position determining device cooperating with said piggyback controller.

10. A vehicle control system according to claim 1 wherein said piggyback controller is switchable to the feature programming mode based on selective activation of at least one other vehicle device.

11. A vehicle control system according to claim 10 wherein the at least one other vehicle device comprises a vehicle ignition switch.

12. A vehicle control system according to claim 10 wherein said piggyback controller is switchable between armed and disarmed modes; and wherein said piggyback controller is switchable to the feature programming mode from the disarmed mode and not the armed mode.

13. A vehicle control system according to claim 1 wherein said piggyback controller is also switchable to a valet mode based on selective operation of the at least one door lock actuator.

14. A vehicle control system according to claim 1 wherein said piggyback controller is also switchable to an override mode based on selective operation of the at least one door lock actuator.

15. A vehicle control system for a vehicle comprising at least one door lock actuator, the vehicle control system comprising:

a remote keyless entry (RKE) system including an RKE transmitter carried by a user, an RKE receiver at the vehicle, and an RKE controller connected to said RKE receiver for selectively operating the at least one door lock actuator based on signals from said RKE transmitter; and a piggyback controller at the vehicle and connected to said at least one door lock actuator for performing at least one desired piggyback control function based on selective operation of the at least one door lock actuator by said RKE controller;

said piggyback controller switching to a feature programming mode based on selective operation of the at least one door lock actuator.

16. A vehicle control system according to claim 15 wherein said piggyback controller switches to the feature programming mode based on selective operation of the at least one door lock actuator in a predetermined pattern.

17. A vehicle control system according to claim 15 wherein said piggyback controller switches to the feature programming mode based on selective operation of the at least one door lock actuator caused by said RKE controller.

18. A vehicle control system according to claim 15 wherein the vehicle also comprises at least one manually operable door lock switch connected to the at least one door lock actuator; and wherein said piggyback controller switches to the feature programming mode based on selective operation of the at least one door lock actuator caused by the manually operable door lock switch.

19. A vehicle control system according to claim 15 wherein the at least one desired piggyback control function comprises switching between armed and disarmed modes.

20. A vehicle control system according to claim 15 wherein the at least one desired piggyback control function relates to remote engine starting.

21. A vehicle control system according to claim 15 further comprising a position determining device cooperating with said piggyback controller.

22. A vehicle control system according to claim 15 wherein said piggyback controller is switchable to the feature programming mode based on selective activation of at least one other vehicle device.

23. A vehicle control system according to claim 22 wherein the at least one other vehicle device comprises a vehicle ignition switch.

24. A vehicle control system for a vehicle comprising at least one door lock actuator, the vehicle control system comprising:

a remote keyless entry (RKE) system including an RKE transmitter carried by a user, an RKE receiver at the vehicle, and an RKE controller connected to said RKE receiver for selectively operating the at least one door lock actuator based on signals from said RKE transmitter; and a piggyback controller at the vehicle and connected to said at least one door lock actuator for performing at least one desired piggyback control function based on selective operation of the at least one door lock actuator by said RKE controller;

said piggyback controller switching to a feature programming mode in which selective operation of the at least one door lock actuator provides feature selection.

25. A vehicle control system according to claim 24 wherein said piggyback controller, when in the feature programming mode, permits feature selection based on selective operation of the at least one door lock actuator caused by said RKE controller.

26. A vehicle control system according to claim 24 wherein the vehicle also comprises at least one manually operable door lock switch connected to the at least one door lock actuator; wherein said piggyback controller, when in the feature programming mode, permits feature selection also based on selective operation of the at least one door lock actuator caused by the at least one manually operable door lock switch.

27. A vehicle control system according to claim 24 wherein the at least one desired piggyback control function comprises switching between armed and disarmed modes.

28. A vehicle control system according to claim 24 wherein the at least one desired piggyback control function relates to remote engine starting.

29. A vehicle control system according to claim 24 further comprising a position determining device cooperating with said piggyback controller.

30. A vehicle control system for a vehicle comprising at least one door lock actuator, the vehicle control system comprising:

a remote keyless entry (RKE) system including an RKE transmitter carried by a user, an RKE receiver at the vehicle, and an RKE controller connected to said RKE receiver for selectively operating the at least one door lock actuator based on signals from said RKE transmitter; and a piggyback controller at the vehicle and connected to said at least one door lock actuator for performing at least one desired piggyback control function based on selective operation of the at least one door lock actuator by said RKE controller;

said piggyback controller switching to at least one of an override mode and a valet mode based on selective operation of the at least one door lock actuator.

31. A vehicle control system according to claim 30 wherein said piggyback controller switches to at least one of the override and valet modes based on selective operation of the at least one door lock actuator in a predetermined pattern.

32. A vehicle control system according to claim 30 wherein said piggyback controller switches to at least one of the override and valet modes based on selective operation of the at least one door lock actuator caused by said RKE controller.

33. A vehicle control system according to claim 30 wherein the vehicle also comprises at least one manually operable door lock switch connected to the at least one door lock actuator; and wherein said piggyback controller switches to at least one of the override and valet modes based on selective operation of the at least one door lock actuator caused by the manually operable door lock switch.

34. A vehicle control system according to claim 30 wherein the at least one desired piggyback control function comprises switching between armed and disarmed modes.

35. A vehicle control system according to claim 30 wherein the at least one desired piggyback control function relates to remote engine starting.

36. A vehicle control system according to claim 30 further comprising a position determining device cooperating with said piggyback controller.

37. A vehicle control system according to claim 30 wherein said piggyback controller is switchable to at least one of the override and valet modes based on selective activation of at least one other vehicle device.

38. A vehicle control system according to claim 37 wherein the at least one other vehicle device comprises a vehicle ignition switch.

39. A method for operating a vehicle control system for a vehicle comprising at least one door lock actuator, the vehicle control system comprising a remote keyless entry (RKE) system including an RKE transmitter carried by a user, an RKE receiver at the vehicle, and an RKE controller connected to the RKE receiver for selectively operating the at least one door lock actuator based on signals from the RKE transmitter, the method comprising:

providing a piggyback controller at the vehicle and connected to the at least one door lock actuator for performing at least one desired piggyback control function based on selective operation of the at least one door lock actuator by the RKE controller; and switching the piggyback controller to a feature programming mode based on selective operation of the at least one door lock actuator.

40. A method according to claim 39 wherein switching is based on selective operation of the at least one door lock actuator in a predetermined pattern.

41. A method according to claim 39 wherein switching is based on selective operation of the at least one door lock actuator caused by the RKE controller.

42. A method according to claim 39 wherein the vehicle also comprises at least one manually operable door lock switch connected to the at least one door lock actuator; and wherein switching is based on selective operation of the at least one door lock actuator caused by the manually operable door lock switch.

43. A method according to claim 39 wherein the at least one desired piggyback control function comprises switching between armed and disarmed modes.

44. A method according to claim 39 wherein the at least one desired piggyback control function relates to remote engine starting.

45. A method according to claim 39 wherein switching is further based on selective activation of at least one other vehicle device.

46. A method according to claim 39 further comprising selecting features also based on selective operation of the at least one door lock actuator.

47. A method according to claim 39 further comprising switching the piggyback controller to at least one of an override mode and a valet mode also based on selective operation of the at least one door lock actuator.

48. A method for operating a vehicle control system for a vehicle comprising at least one door lock actuator, the vehicle control system comprising a remote keyless entry (RKE) system including an RKE transmitter carried by a user, an RKE receiver at the vehicle, and an RKE controller connected to the RKE receiver for selectively operating the at least one door lock actuator based on signals from the RKE transmitter, the method comprising:

providing a piggyback controller at the vehicle and connected to the at least one door lock actuator for performing at least one desired piggyback control function based on selective operation of the at least one door lock actuator by the RKE controller; and switching the piggyback controller to at least one of an override mode and a valet mode based on selective operation of the at least one door lock actuator.

49. A method according to claim 48 wherein switching is based on selective operation of the at least one door lock actuator in a predetermined pattern.

50. A method according to claim 48 wherein switching is based on selective operation of the at least one door lock actuator caused by the RKE controller.

51. A method according to claim 48 wherein the vehicle also comprises at least one manually operable door lock switch connected to the at least one door lock actuator; and wherein switching is based upon selective operation of the at least one door lock actuator caused by the manually operable door lock switch.

52. A method according to claim 48 wherein the at least one desired piggyback control function comprises switching between armed and disarmed modes.

53. A method according to claim 48 wherein the at least one desired piggyback control function relates to remote engine starting.

54. A method according to claim 48 wherein switching is based on selective activation of at least one other vehicle device.

55. A method according to claim 54 wherein the at least one other vehicle device comprises a vehicle ignition switch.

* * * * *